United States Patent [19]

Straughn et al.

[11] 3,925,563
[45] Dec. 9, 1975

[54] PREPARING AN EXTRUDED PUFFED SNACK PRODUCT

[75] Inventors: Robert O. Straughn; Gary L. Elofson; Richard D. Reinhart, all of Minneapolis, Minn.

[73] Assignee: General Mills, Inc., Minneapolis, Minn.

[22] Filed: May 27, 1970

[21] Appl. No.: 40,979

[52] U.S. Cl. ............... 426/302; 426/549; 426/622; 426/637; 426/516; 426/518; 426/439; 426/466
[51] Int. Cl. .............................................. A23l 1/12
[58] Field of Search ........... 99/83, 100, 207, 80, 82, 99/238 R; 107/14 R, 14 A, 14 C, 14 CA, 14 F; 425/376–380; 426/302, 439, 466, 516, 518

[56] References Cited
UNITED STATES PATENTS

| | | | |
|---|---|---|---|
| 3,027,258 | 3/1962 | Markakis | 99/207 |
| 3,085,020 | 4/1963 | Backinger | 99/207 |
| 3,094,059 | 6/1963 | Graham | 99/238 R |
| 3,114,639 | 12/1963 | Rivoche | 99/207 |
| 3,139,342 | 6/1964 | Linsky | 99/82 |
| 3,212,461 | 10/1965 | Fritzberg | 425/377 |
| 3,259,503 | 7/1966 | Tarr | 99/83 |
| 3,297,450 | 1/1967 | Loska | 99/207 |
| 3,451,822 | 6/1969 | Fast | 99/100 P |
| 3,451,822 | 6/1969 | Fast | 99/207 |
| 3,502,479 | 3/1970 | Singer | 99/100 |
| 3,539,356 | 11/1970 | Benson | 99/83 |
| 3,544,332 | 12/1970 | Leebens | 99/82 |
| 3,682,652 | 8/1972 | Corbins | 99/83 |

*Primary Examiner*—Norman Yudkoff
*Assistant Examiner*—M. Mullen
*Attorney, Agent, or Firm*—Gene O. Enockson; Norman P. Friederichs; Anthony A. Juettner

[57] ABSTRACT

A method is provided for preparing a puffed snack product resembling a French fried potato stick. Dry ingredients including a meal (e.g. corn grits), potato granules and flavoring may be dry blended. Sufficient water is added to the blend to raise the total moisture content to between 16 and 22%, by weight. The mixture is tempered for between one half hour and twenty-four hours. The mixture is treated in a collet type extruder where the temperature is raised to between 255° and 340°F. and the pressure is between 800 and 1500 pounds per square inch gauge (p.s.i.g.). The mixture expands upon extrusion and is cut into pieces which are toasted and enrobed with an edible oil and salt.

8 Claims, 3 Drawing Figures

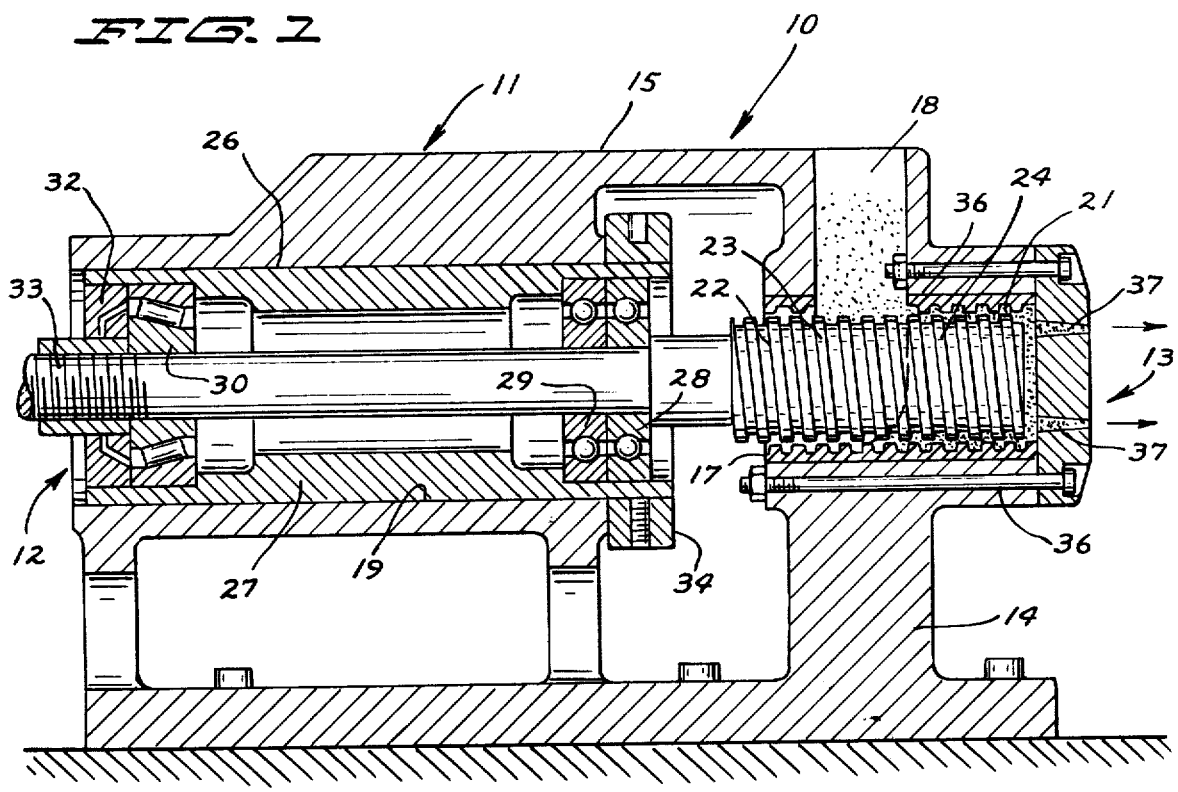
FIG. 1
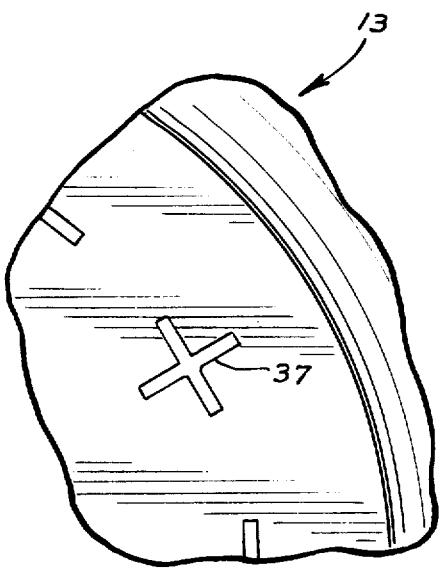
FIG. 3
FIG. 2
INVENTOR.
ROBERT O. STRAUGHN
GARY L. ELOFSEN
BY RICHARD D. REINHART
Norman P. Friederichs

PREPARING AN EXTRUDED PUFFED SNACK PRODUCT

BACKGROUND OF THE INVENTION

The present invention relates to a new and improved method for producing snack product, and more particularly it relates to a method for producing a snack product resembling a French fried potato stick.

The food products which are sold in the general category of snack items are many and varied, typically including such things as chips (e.g. potato chips, corn chips), and puffs (e.g. corn puffs). Snack items account for a large dollar volume in the food industry. Generally, snack items are eaten apart from a regular meal. Often different snack items are served at the same time.

People generally regard snacks rather discriminatingly. A person will sample various snacks in a leisurely manner centering his choice on those snacks which have some sort of special appeal. Thus such things as taste, texture, and appearance are crucial to the success of a particular snack item. Manufacturers of snacks have done considerable work in developing refinements in their established products. A good deal of creative effort also has been directed toward making new snack products which are distinctive in some regard.

The present invention relates to a method for producing a new semi-puffed type snack product which resembles a French fried potato or potato stick. In the past, French fried potatoes typically have been prepared by slicing fresh potatoes into elongated rectangularly shaped pieces, then deep fat frying the pieces and finally coating with flavoring materials such as salt. Such French fried potatoes are delicious snacks if properly prepared; however, they have certain inherent disadvantages. For example, the potatoes both in the fresh state and in the fried state provide a stability problem. Also, the known French fried potatoes necessitate deep fat frying immediately prior to eating thereof.

The present invention overcomes the stated disadvantages of the known method for making French fried potatoes. The present invention provides a method for producing a French fried potato type snack by mixing and extruding a formulated mixture using a collet extruder. In developing the present invention, it was discovered that the product could be produced using a collet extruder providing the process conditions are very closely controlled, particularly temperature, pressure and water content.

The process of the present invention may be carried out using conventional collet extrusion equipment such as that disclosed in U.S. Pat. No. 3,358,582, having provision for controlling the temperature of the extrusion barrel and in turn the temperature of the feed mixture during the time the mixture is in the collet extruder. The collet extruder normally will include a housing with a flighted bore or screw chamber therein and a flighted screw disposed in the screw chamber. A head plate including a dye will be disposed in the forward end of the screw chamber, and a driving means such as an electric motor will be located at the rear end of the screw. A collet extruder will normally include a hopper for feeding the formulated mixture to the screw chamber.

THE PRESENT INVENTION

FIG. 1 shows a vertical cross sectional view of an extruder that may be used in the present invention;

FIG. 2 shows a front view of the die of the present invention; and

FIG. 3 shows an enlarged view of an extrusion orifice of the present invention.

Apparatus which may be used in the present invention is shown in FIGS. 1, 2 and 3. The extruder 10 includes a housing 11, a screw assembly 12 and a head plate or die 13.

The housing 11 has a lower portion 14 which serves as a base or support and an upper portion 15. A bore or screw chamber 17 is defined in the forward portion of housing 11. An inlet 18 is defined in the forward portion of housing 11 for feeding material to the screw chamber 17. A screw support chamber 19 is provided in the rear portion of housing 11. The housing 11 may be constructed of any suitable material such as cast iron and may be formed by molding or casting. If desired, a sleeve 21 may be provided in screw chamber 17. The sleeve 21 may be locked with respect to housing 11 such as by a key (not shown). If desired, the sleeve 21 may be flighted.

The screw assembly 12 includes a flighted screw 22 at the forward end thereof. The screw 22 has a feeding portion 23 which cooperates with inlet 18 for feeding material to the compression portion 24 of screw 22. The length to diameter ratio of the compression portion is preferably in the range of 1:1 and 3:1. The screw assembly 12 further has a rear support section 26 including a sleeve 27, bearings 28, 29 and 30, an oil ring 32 and a shaft 33. The sleeve 27 is mounted, during operation, in the screw support chamber 19, and is locked with respect thereto such as by a key or set-screw (not shown). The bearings each include an outer race which is locked with respect to sleeve 27 and an inner race that is locked with respect to shaft 33 and rotatable with respect to sleeve 27. The rear support section may be held in place such as by lock-ring 34. Power means such as an electric motor is drivingly connected to the rear portion of shaft 33 for driving the extruder.

The head plate or die 13 is mounted at the forward end of housing 11 and may be secured thereto by bolts such as 36. The head plate abuts against housing 11 and may be spaced a small distance from the forward end of screw 22. The head plate includes a plurality of shaped orifices 37. The orifices in one preferred embodiment of the present invention are a pair of intersecting slits or in other words in the shape of a cross. The slits intersect each other at their center and are perpendicular to each other. The length of each slit is at least 4.5 (preferably about 5) times the width of the slit. The orifice surprisingly provides a square shaped extrudate. In other words, the extruded rope has the cross-sectional shape of a French fried potato.

The mixture used in carrying out the method of the present invention is prepared from the dry blend including 0 to 70 parts of a meal such as corn grits or rice meal, 30 to 100 parts of dried finely ground particles of potato and, if desired, small amounts of flavoring such as salt. If desired, food coloring, lactose, dextrose or invert sugars may be added to the dry blend for coloring purposes. The materials may be blended using a conventional ribbon mixer. Moisture is added to the dry blend in an amount to raise the total moisture content to between 16 and 22%, preferably between 17 and 19% by weight based on the total weight of the mixture. The mixture is then permitted to temper or, in other words, set for at least one half hour, generally about 1½ to 2 hours and seldom, if ever, longer than 24 hours, in order to permit the moisture to become uniformly dispersed throughout the mixture.

The mixture next is passed into the collet extruder through inlet 18 and the mixture is worked in screw chamber 17. The pressure exerted by the screw on the mixture should be between 800 and 1500 p.s.i.g. (preferably between 900 and 1200 p.s.i.g.) as the mixture approaches the die 13. The temperature of the mixture rises as the mixture is worked and the pressure is applied. The temperature of the mixture, of course, should be maintained below that at which the mixture carbonizes or burns during treatment in the collet extruder. The temperature of the mixture approaching the die is normally between 255° and 340°F., preferably about 275°F. The mixture is extruded into the desired shape such as square in cross section and expands or puffs between 4 and 5.5 times, preferably about 4.8 times, its original volume. The puffed product is then cut into short pieces as desired, for example, 2 or 3 inches in length.

EXAMPLE I

A snack was prepared according to the method of the present invention by dry blending, by weight, 75 parts granulated potato solids and 25 parts corn grits. The potato solids had a moisture content of about 8 to 10% and the corn grits had a moisture content of 8% by weight. Sufficient moisture was added to raise the total moisture content to about 19%. After the moisture was thoroughly distributed throughout the potato-corn mixture, the mixture was fed to a collet extruder having a bore with an internal diameter of about 3 inches and an effective working length of about 3 inches or, in other words, a length to diameter ratio of 1:1. The extruder was provided with a cooling jacket. The mixture entering the die was maintained at a temperature of 265°F. and a pressure of about 925 p.s.i.g. The mixture passed through the collet extruder at the rate of 2.5 pounds per minute. The extrudate expanded about 4.8 times upon extrusion. The collet extruder was provided with the die shown in FIG. 2. The expanded product was square in cross sectional shape with each side of the square being about 5/16 inch. The expanded product was cut at the face of the die to provide pieces approximately 2½ inches in length. The pieces were toasted in an oven at about 300°F. for about 3 minutes. The toasted pieces were enrobed with a vegetable oil, namely, coconut oil and salt. The final composition was approximately 53¼% potato solids, 17¼% corn solids, 25% coconut oil, 2.5% salt and 2% moisture, by weight.

EXAMPLE II

A snack was prepared as described in Example I except that the moisture content of the mixture was adjusted to 17%. The pressure exerted on the mixture at the die was 925 p.s.i.g. and the temperature of the mixture at the die was 275°F. The product, following extrusion, was permitted to hang downwardly from the extruder for about three feet until the product hardened. The product was then cut into pieces about 2½ inches in length. The vertical suspension of the extrudate resulted in a product that was much more straight and uniform in shape. The product was toasted and enrobed as discussed in Example I.

EXAMPLE III

A snack was prepared according to the present invention by dry blending, by weight, 60 parts potato granules and 40 parts corn grits. The total moisture content was raised to 19%. Potato snack pieces were then extruded as described in Example II except that the extrusion temperature was 300°F. The extrudate was not cut at the face of the die but rather was extruded onto a moving conveyor belt. The conveyor belt was moving slightly faster than the extrudate was leaving the extruder, thereby slightly stretching the extrudate and holding the extrudate straight as the extrudate hardened. The stretching process reduced the size of each side of the extrudate by about ⅓. The ratio of the linear velocity of the extrudate upon extrusion and prior to contact with the belt was equal to about 7/9 of the linear velocity of the conveyor belt. The rope hardened and then was cut into 2½ inch pieces. The product was toasted and enrobed.

The embodiments of the invention in which an exclusive property or privilege is claimed are defined as follows:

1. A method for preparing a puffed snack product resembling a French fried potato stick, said method comprising: dry blending a mixture including by weight at least 30% potato solids and up to 70% cereal meal; adding and thoroughly dispersing sufficient water in said dry blend to raise the total moisture content of the mixture to between 16 and 22%, by weight; working the mixture in an extruder under a controlled temperature of up to 340°F.; adjusting the mixture to a temperature in the range of between 255° and 340°F. and a pressure in the range of between 800 and 1500 pounds per square inch gauge and then extruding and expanding the mixture, said mixture expanding between 4 and 5.5 times upon extrusion; cutting the extruded mixture into pieces; toasting the pieces and enrobing the pieces with an edible oil and salt.

2. The method of claim 1 wherein the working and extrusion of the mixture is carried out using an extruder having a compression screw length to diameter ratio in the range of about 1:1 to 3:1.

3. The method of claim 1 wherein the working and extrusion of the mixture is carried out using a collet extruder.

4. The method of claim 1 wherein the extruded product is suspended vertically until the product hardens and then the hardened product is cut into pieces.

5. The method of claim 1 wherein the extruded product is extruded onto a conveyor belt, said conveyor belt having a greater linear speed than the linear speed of the product leaving the extruder.

6. The method of claim 3 wherein the extrusion orifice comprises a pair of intersecting slits thereby providing an extruded piece that is substantially square in cross-section.

7. The method of claim 6 wherein slits intersect at the center of said slits, said slits are perpendicular to each other and the length of each of said slits is at least about 4.5 times the width of said slit.

8. The method of claim 7 wherein the length of each of said slits is about 5 times the width of said slit.

* * * * *